United States Patent
Smith et al.

(10) Patent No.: US 8,948,998 B2
(45) Date of Patent: Feb. 3, 2015

(54) MACHINE THROTTLE SYSTEM

(75) Inventors: Sage F. Smith, Apex, NC (US);
Christian Nicholson, Raleigh, NC (US)

(73) Assignee: Caterpillar SARL, Geneva (CH)

( * ) Notice: Subject to any disclaimer, the term of this patent is extended or adjusted under 35 U.S.C. 154(b) by 463 days.

(21) Appl. No.: 13/325,583

(22) Filed: Dec. 14, 2011

(65) Prior Publication Data

US 2013/0158836 A1    Jun. 20, 2013

(51) Int. Cl.
*F02D 28/00*    (2006.01)

(52) U.S. Cl.
USPC ............................ 701/103; 123/399; 701/102

(58) Field of Classification Search
CPC ........... F02D 1/04; F02D 1/10; F02D 9/1065; F02D 9/1095; F02D 11/02; F02D 11/10; F02D 29/02; F02D 41/26; B60W 10/06; F02M 59/447
USPC .......... 701/102, 103, 110, 115; 123/336, 337, 123/361, 367, 398, 399, 339.13, 339.14
See application file for complete search history.

(56) References Cited

U.S. PATENT DOCUMENTS

| | | | |
|---|---|---|---|
| 4,325,266 A | | 4/1982 | Lynch |
| 4,779,480 A | * | 10/1988 | Stocker ............................ 74/513 |
| 4,860,848 A | * | 8/1989 | Barth et al. ................... 180/197 |
| 5,056,615 A | * | 10/1991 | Duthie et al. ................. 180/306 |
| 5,203,214 A | | 4/1993 | Frisbee et al. |
| 5,575,255 A | * | 11/1996 | Abe et al. ...................... 123/336 |
| 6,041,673 A | | 3/2000 | Schmillen |
| 6,065,448 A | | 5/2000 | Hatton et al. |
| 6,334,430 B1 | * | 1/2002 | Itabashi ........................ 123/336 |
| 7,121,258 B2 | * | 10/2006 | Nakamoto et al. ............ 123/399 |
| 7,237,528 B2 | * | 7/2007 | Matsuda ....................... 123/336 |
| 7,472,684 B1 | | 1/2009 | McKee et al. |
| 7,500,467 B2 | * | 3/2009 | Hanamura .................... 123/399 |
| 2008/0184958 A1 | * | 8/2008 | Sato et al. ..................... 123/336 |
| 2008/0216794 A1 | * | 9/2008 | Kuji et al. ..................... 123/336 |
| 2009/0143948 A1 | | 6/2009 | Dahl |
| 2010/0095930 A1 | * | 4/2010 | Wong ............................ 123/336 |

FOREIGN PATENT DOCUMENTS

| | | |
|---|---|---|
| EP | 1216876 | 6/2002 |
| JP | 2010285970 | 12/2010 |

* cited by examiner

*Primary Examiner* — John Kwon
*Assistant Examiner* — Johnny H Hoang
(74) *Attorney, Agent, or Firm* — Miller, Matthias & Hull; Bart A. Fisher

(57) ABSTRACT

A machine throttle system according to an embodiment of the present disclosure includes a power system configured to operate at different speeds. The power system is coupled to a first throttle device and a second throttle device. A control module is communicatively coupled to the power system, the first throttle device, and the second throttle device. The control module is configured to cause the power system to operate at a first speed in response to the first throttle device being set to a level. The control module is also configured to cause the power system to increase in speed in response to the second throttle device when the first throttle device level is set below a predetermined value. The control module is further configured to cause the power system to decrease in speed in response to the second throttle device when the first throttle device level is set at or above the predetermined value.

20 Claims, 4 Drawing Sheets

MACHINE THROTTLE SYSTEM

TECHNICAL FIELD

The present disclosure relates generally to a machine operator control system. Specifically, the present disclosure relates to a machine engine throttle system.

BACKGROUND

Machines, such as skid steer loaders, multi-terrain loaders, compact track loaders, track loaders, wheel loaders, track-type tractors, as well as other machines, are often used in materials handling, construction, and other industries. These machines include a power system, such as an engine, to power operations of the machine. Additionally, the machines include interface systems, such as joysticks, steering wheels, levers, pedals and the like, to control the operations of the machines.

An engine throttle is used to set the engine to operate at a desired speed. Some machines have a hand operated throttle, some have a foot operated throttle, and other machines have both a hand operated throttle and a foot operated throttle. The hand throttle generally stays at a desired throttle level after being set. Conversely, the foot throttle generally adjusts throttle only as it is being pressed. In use, it is generally desirable to set a throttle level using the hand throttle. However, it may become desirable to temporarily adjust throttle while operating the machine. Because the operator may be occupied operating the interface systems, it may be impractical to continually remove the operator's hands from the interface systems to adjust the hand throttle.

U.S. Pat. No. 5,203,214 to Frisbee et al. discloses an engine throttle linkage with a motion-reversing feature. This system allows an operator to have a machine engine "idle" at a lower speed and manually accelerate it or, at a higher speed and manually decelerate it. However, this system uses a complex engine throttle linkage of the type having a throttle rod and a pivot-mounted shaft for moving the rod in either of two directions for engine acceleration and deceleration, respectively. A pedal is depressed for pivoting the shaft and, consequently, moving the rod. This includes a motion-reversing mechanism with a lever-like member connected to the shaft and having first and second attachment points. An operator's pedal is coupled to one of the two attachment points by a linking stem. Pedal depression pivots the shaft in one direction or the other. Depressing the pedal accelerates or decelerates the engine, depending upon which attachment point is used.

In view of the above, it is desirable to provide a more versatile and simple machine throttle system. Thus, the present disclosure is directed to overcoming one or more of the problems discussed above.

SUMMARY

In one aspect, the present disclosure provides a machine throttle system. According to an embodiment, the machine throttle system includes a power system configured to operate at different speeds. The power system is coupled to a first throttle device and a second throttle device. A control module is communicatively coupled to the power system, the first throttle device, and the second throttle device. The control module is configured to cause the power system to operate at a first speed in response to the first throttle device being set to a level. The control module is also configured to cause the power system to increase in speed in response to the second throttle device when the first throttle device level is set below a predetermined value. The control module is further configured to cause the power system to decrease in speed in response to the second throttle device when the first throttle device level is set at or above the predetermined value.

In another aspect of the present disclosure provides a machine throttle system that includes an engine configured to operate at different speeds, a hand throttle device, and a foot throttle device. A control module is communicatively coupled to the engine, the hand throttle device, and the foot throttle device. The control module is configured to receive a first input from the hand throttle device and instruct the engine to operate at a first speed in response to the first input. The control module is also configured to receive a second input from the foot throttle device. In addition, the control module is configured to determine whether the first input is a high throttle value, and instruct the engine to operate at a second speed, which is different than the first speed, in response to determining that the first input is a high throttle value.

In yet another aspect the present disclosure provides a machine. In an embodiment, the machine includes a frame, an engine, a propulsion system, and a throttle system. The engine is supported by the frame and configured to operate at different speeds. The propulsion system is coupled to the frame and the engine and is configured to propel the machine. The throttle system includes a hand throttle device, a foot throttle device, and a control module. The control module is communicatively coupled to the engine, the hand throttle device, and the foot throttle device. The control module is configured to receive a first input from the hand throttle device and instruct the engine to operate at a first speed in response to the first input. The control module is also configured to determine whether the first input is a high throttle value. Additionally, the control module is configured to receive a second input from the foot throttle device. Furthermore, the control module is configured to instruct the engine to operate at a second speed, which is different than the first speed, in response to determining that the first input is a high throttle value.

Other features, aspects, and advantages of this disclosure will be apparent from the following description and the accompanying drawings.

BRIEF DESCRIPTION OF THE DRAWINGS

The drawings illustrate exemplary embodiments of the disclosure and when accompanied with the description provided herein serve to explain the present disclosure by way of example and should not be construed to limit the present disclosure.

DETAILED DESCRIPTION

The present disclosure relates generally to a machine operator control system. Specifically, the present disclosure relates to a machine engine throttle system. Embodiments of the present disclosure provide a machine throttle system configured to temporarily increase or decrease machine power system (e.g., engine) operating speed. In a specific embodiment, the throttle system is configured to temporarily adjust power system operating speed without the operator being required to remove hands from the operator interface devices, such as joystick(s) or a steering wheel. Such temporary reduction in power system operating speed allows the operator to temporarily reduce engine noise, temporarily reduce machine ground speed, and temporarily reduce the machine hydraulic system.

Figure 1:
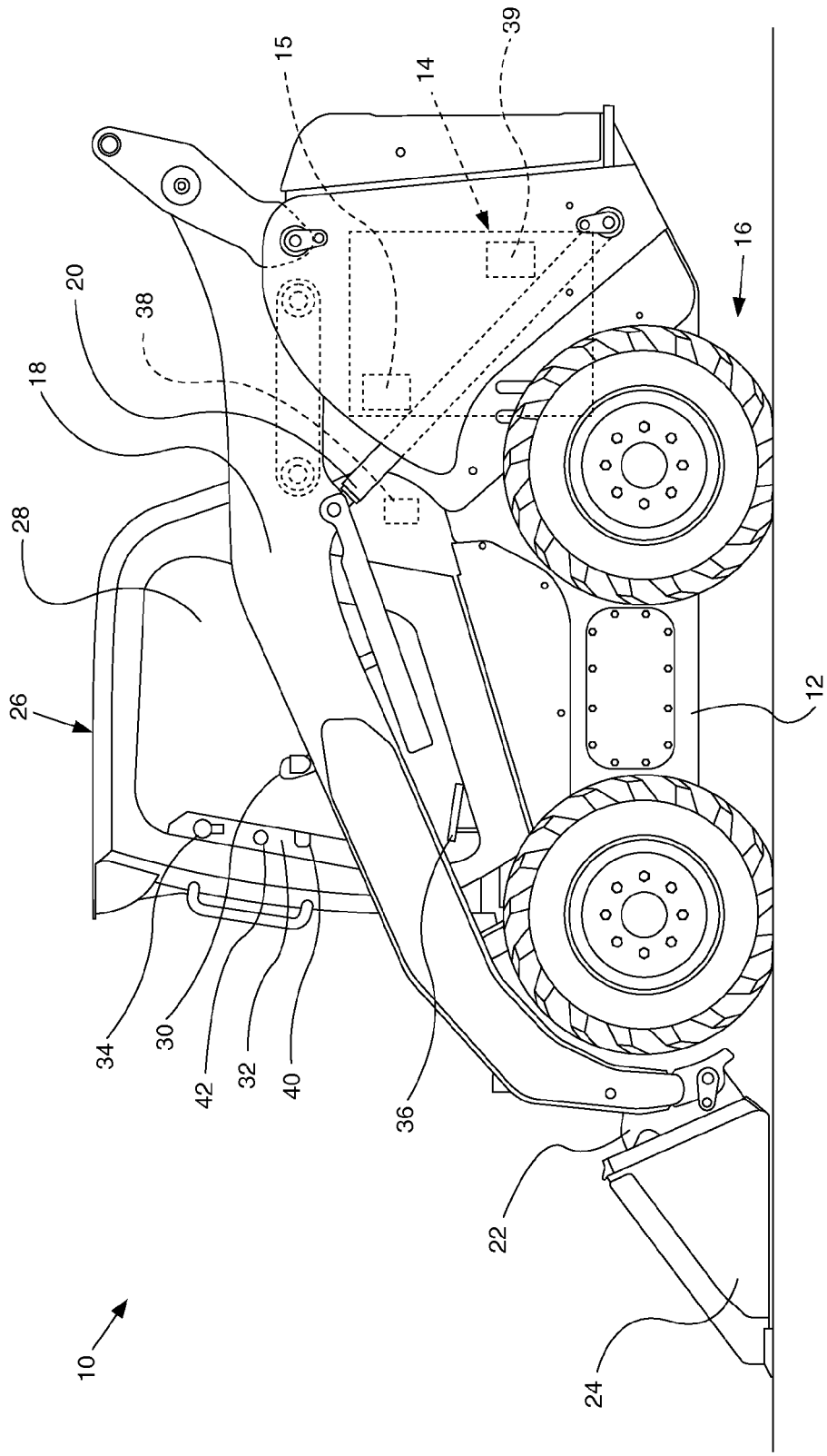
FIG. 1 illustrates a side view of a machine configured with a throttle system according to an embodiment of the present disclosure.

FIG. 1 illustrates a side view of a machine 10 configured with a throttle system according to an embodiment of the present disclosure. The machine 10 illustrated in FIG. 1 and discussed throughout this disclosure is generally known as a skid-steer loader. However, it should be readily understood by those having ordinary skill in the art that the systems of the present disclosure can be used on other machines such as multi-terrain loaders, compact track loaders, track-type tractors, wheel loaders, track loaders, and any other machine configured having multiple throttle devices.

In an embodiment, the machine 10 includes a frame 12, a power system 14, and a propulsion system 16. The frame 12 may take many different forms as will be recognized by those of ordinary skill in this art. For example, the frame 12 may be a rigid frame, a flexible frame, an articulating frame, or any other type of frame/frame assembly capable of supporting machine 10. In addition, the frame 12 may be configured to mate with a machine undercarriage system (not shown), as should be readily understood.

The power system 14 may include an engine such as, a diesel engine, a gasoline engine, a gaseous fuel-powered engine or any other type of combustion engine. It is contemplated that power system 14 may alternatively embody a non-combustion source of power such as a fuel cell, a power storage device, or any other type of power source. Power system 14 produces a mechanical or electrical power output that is then converted to mechanical, hydraulic, electrical, and/or other power for operating the machine 10. The power system 14 includes a battery 15 electrically coupled to various components of the power system 14 (e.g., starter motor, alternator, & etc. (not shown)) and/or various components of the machine (e.g., lights, HVAC system, etc. (not shown)) to provide electrical energy to the various components.

The propulsion system 16 may include a wheel-drive system, a track-drive system (not shown), or any other type of drive system to propel the machine 10. The propulsion system 16 may also include a transmission, a fluid pump (e.g., hydraulic system), and/or other devices to convert energy from the power system 14 to propel the machine 10 using the propulsion system 16. As mentioned above, the propulsion system 16 may include an undercarriage system (not shown) configured to receive power from the power system 14 and to convert that power to movement to propel the machine 10.

The machine 10 may further include one or more lift arms 18 pivotably coupled to the machine 10. One or more hydraulic cylinders 20 are operatively coupled between the frame 12 and the lift arms 18 to raise and lower the lift arms 18. A hydraulic system (not shown) utilizes power from the power system 14 to generate pressurized fluid to operate the hydraulic system.

A work tool coupler 22 may be coupled to the lift arms 18. The coupler 22 is configured to selectively attach to a work tool 24, such as a bucket, as shown in FIG. 1. The work tool 24 may be configured as a bucket, a blade, a broom, a hammer, a rake, a grapple, a fork, or any other type of work tool. Construction and operation of the lift arms 18, hydraulic cylinder 20, coupler 22, and work tool 24 should be understood by those having ordinary skill in the art.

Machine 10 further includes an operator station 26 supported by the frame 12. The operator station 26 is configured to hold an operator of the machine 10, and to allow the operator to control operations of the machine 10 from the operator station 26.

As such, the operator station 26 includes a seat 28, one or more operator interface device(s) 30 and one or more control panel(s) 32. The seat 28 is operatively coupled to the frame 12 and is configured to support the operator during operation of the machine 10. An operator interface device 30, such as a joystick, steering wheel, lever, knob, button, switch, and/or a variety of other interface devices receive input, such as motion, pressure, etc., from the operator and communicate that input for controlling operation of the machine 10.

For example, the operator may sit in the seat 28 and manipulate one or more operator interface device(s) 30 (e.g., configured as joysticks having buttons, switches, and/or knobs), which causes the machine 10 to travel using the propulsion system 16 powered by the power system 14. In addition, manipulation of the operator interface device(s) 30 may cause the hydraulic system (not shown) to operate the hydraulic cylinder(s) 20, which raises and lowers the lift arm(s) 18, pivoting with respect to the frame 12 of the machine 10. Furthermore, manipulation of the interface device(s) 30 may operate work tool 24 using hydraulic, electrical, and/or other energy.

To control a throttle level or engine output (e.g., engine revolutions per minute (RPM)) for the power system 14, the operator station 26 includes one or more throttle devices configured to increase and/or decrease the throttle level of the power system 14. In an embodiment, the machine 10 includes a hand throttle device 34 at the control panel 32. The hand throttle device 34 is a rotating switch configured to adjust clock-wise and counter-clock-wise between a low throttle level and a high throttle level. Once set to a throttle level by the operator, the hand throttle device 34 substantially stays at that throttle level until adjusted again by the operator. However, it should be understood that other types of throttle devices may be used as a first throttle device.

Additionally, the machine 10 includes a foot throttle device 36 in the operator station 26. The foot throttle device 36 is generally a pedal operable by the operator's foot and is configured be pressed from a resting position and then return to the resting position after pressure is reduced or removed from the foot throttle device 36. Thus, the foot throttle device 36 is configured to adjust the throttle level of the power system 14 between the low throttle level when not pressed and the high throttle level when fully pressed. However, it should be understood that other types of throttle devices may be used as a second throttle device. In an embodiment, a high throttle level is any throttle level at 90% or more of full throttle for either hand throttle 34 or foot throttle 36. However, in alternative embodiments, any desired level may be used as a high throttle level.

The control panel 32 includes various instruments, interface devices, and other controls configured to assist the operator in operating the machine 10. For example, the control panel 32 may include a machine key switch 40. The key switch 40 receives electrical power from the battery 15 and selectively passes it to other systems of the machine 10, such as the power system 14 to cause the power system 14 to start and continue operating.

The control panel also includes instruments, instrument clusters, and/or gauges, such as a tachometer 42, configured to measure and display a value of engine operating speed (e.g., revolutions per minute (RPM)) for the power system 14. In addition, other instruments/gauges such as oil pressure, temperature, ground speed, system diagnostics, power system hours, and a variety of other instruments/gauges may be incorporated with the control panel 32. The instruments/gauges may be configured as individual devices or may be selectively displayed on a graphical user interface display panel (not shown).

A controller device 38 (e.g., a machine electronic control module) is communicatively coupled to an electronic control unit (ECU) 39. The controller device 38 and/or the ECU may be a microprocessor, a plurality of microprocessors, a computer system, or any other type of information handling system that may include additional microchips and components for random access memory, data storage, and other functions as necessary to enable the communication, processing and other functionalities described herein.

The controller device 38 and the ECU 39 are additionally communicatively coupled to various inputs and outputs of the machine 10 in order to control operations of the power system 14, the propulsion system 16, the lift arms 18, the coupler 22, the work tool 24, and/or various other functions of the machine 10. The machine 10 is provided with sufficient electrical and electronic connectivity to enable such communication.

Figure 2:
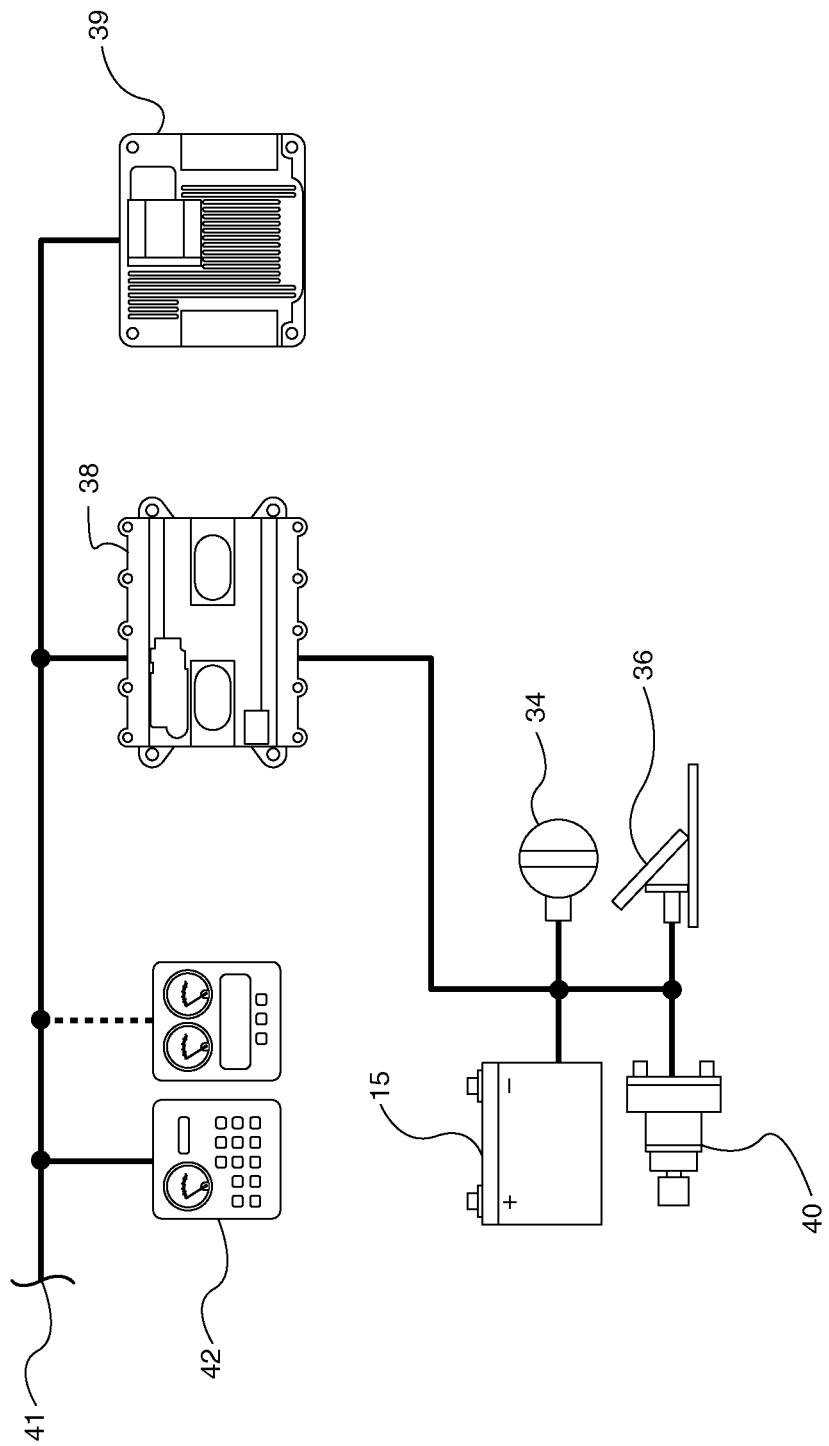
FIG. 2 illustrates a block diagram of a portion of an embodiment of an electrical system for the throttle system of the machine shown in FIG. 1.

For example, FIG. 2 illustrates a block diagram of a portion of an embodiment of an electrical system for the throttle system of the machine 10. As illustrated, the battery 15, the hand throttle 34, the foot throttle 36 and the key switch 40 are electrically and/or communicatively coupled to the controller device 38. Similarly, the ECU 39 and instruments, such as the tachometer 42, are electrically and/or communicatively coupled to the controller device 38. In an embodiment, communication line 41 is an electronic data communication message bus (e.g., SAE J1939) configured to facilitate communication between components coupled to the communication bus. It should be understood that other communication systems may be used with the systems of the present disclosure.

Electrical power for systems of the machine 10 (e.g., the throttle system of the present disclosure) passes through the key switch 40 when the key switch 40 is in an on position to power the electrical systems of the machine 10. When the key switch 40 is turned to an off position, electrical power does not pass through to the systems of the machine 10. In alternative embodiments, a relay (not shown) or other switch (not shown) controlled by the key switch 40 may be used for switching electrical power. The battery 15, along with any applicable alternator (not shown) or other electrical generating system (not shown) provides electrical power for the controller device 38, the ECU 39, throttle devices 34 & 36, operator interface device(s) 30, tachometer 42, and/or other electrical systems described herein. The tachometer 42 is configured to measure and display a value for engine operating speed (e.g., revolutions per minute (RPM)) for the power system 14.

The controller device 38 and/or the ECU 39 may use the information of power system 14 operating speed either alone or in combination with information relating to other operational characteristics of power system 14 and/or machine 10, to calculate or otherwise determine if and when the power system 14 is at high throttle, low throttle, or any throttle therebetween. In addition, the controller device 38 and/or the ECU 39 may further use this information to calculate or otherwise determine a value to increase or decrease operating speed of the power system 14 depending on inputs received from the hand throttle 34 and/or the foot throttle 36, as described in more detail below.

Frequently, in use, an operator will set the hand throttle 34 to a predetermined level, such as high throttle level, and leave it there during the work operation cycle. At some point in time during the work operation cycle it may be desirable to temporarily reduce the throttle level (e.g., power system operating speed) to temporarily reduce machine response (e.g., when machine 10 is near a truck to dump a load from the work tool 24 or when machine 10 is traveling around a sharp corner), or to temporarily reduce machine noise (e.g., when having a conversation). However, it is inefficient for the operator to remove his or her hands from the operator interface device(s) 30 to reach to the hand throttle 34 and adjust it time and time again to have the throttle level set to the desired level for the short term time period.

Thus, the throttle system of the present disclosure provides a throttle system configured to allow the foot throttle 36 to be used as a deceleration pedal to reduce power system 14 operating speed (e.g., RPM) when the hand throttle 34 is set to a high throttle level (e.g., 90% full throttle or greater). As such, if the hand throttle 34 is not set at or above a pre-determined high throttle level, pressing the foot throttle 36 will cause the power system 14 operating speed or throttle level to increase. Conversely, if the hand throttle 34 is set at or above a predetermined high throttle level, pressing the foot throttle 36 will cause the power system 14 operating speed or throttle level to decrease. This provides an efficiency benefit to the operator by allowing for the temporary increase or decrease of power system operating speed without the operator having to remove his or her hands from the operator interface device(s). In an embodiment, the operator may have the ability to set or adjust what power system 14 output is the high throttle level (e.g., approximately 90%, 85%, 80%, etc.) and/or resulting power system output level. In addition, the operator may have the ability to turn on and off the throttle deceleration system. Thus, the operator may adjust the system depending on how he or she is using the machine 10.

Whether the power system operating speed increases or decreases depends on where the hand throttle level is set. If it is set at or above a predetermined high throttle level (e.g., approximately 90% full throttle, but any desired level is acceptable as a high throttle level), the foot throttle 36 will decrease or decelerate power system operating speed. If it is set below the predetermined high throttle level, the foot throttle 36 will increase or accelerate power system operating speed. In other words, the throttle system of the present disclosure changes functionality of a specific throttle device based on a set position of the other throttle device. It should be understood that this type of system may be applied to any machine having a dual throttle system.

Figure 3:
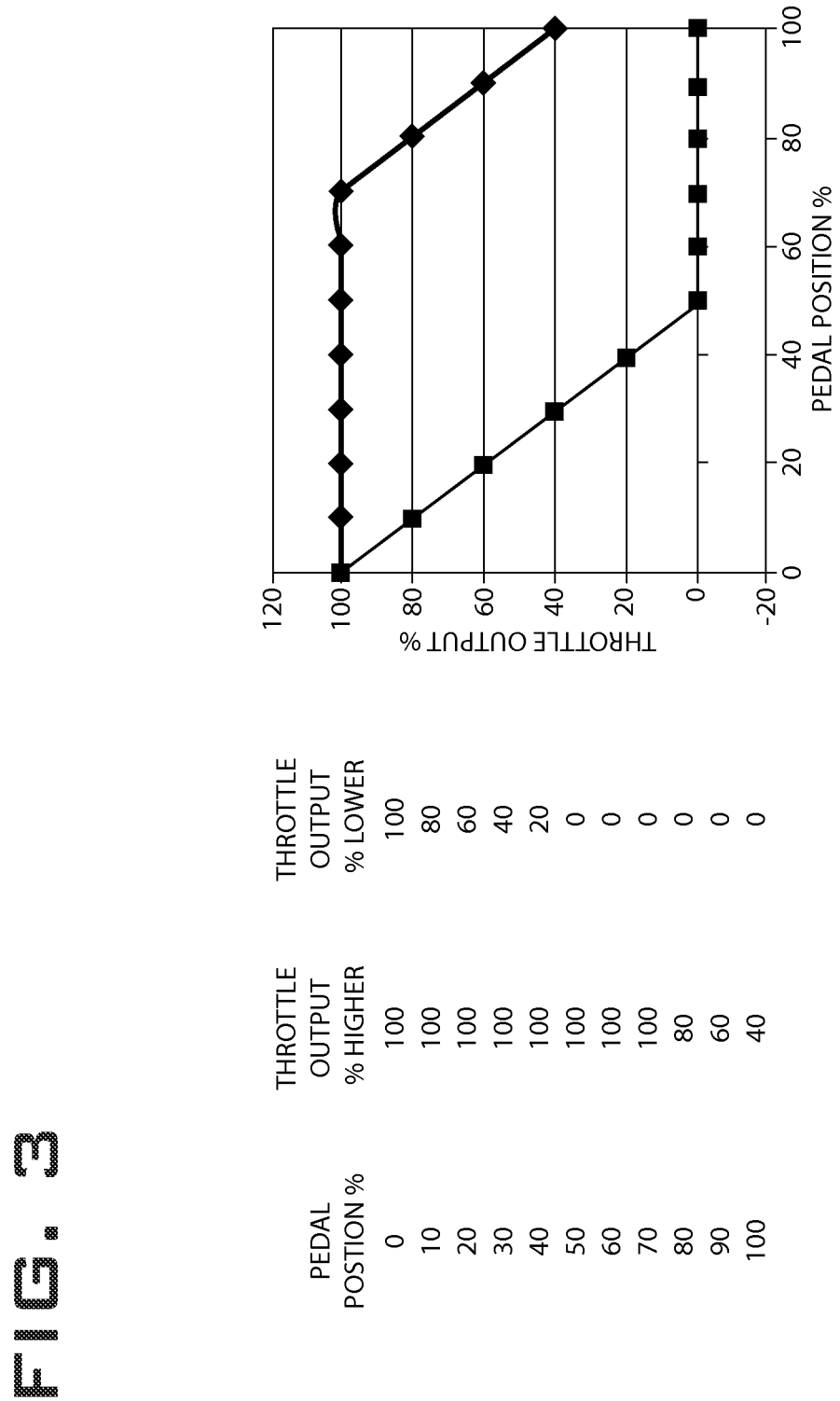
FIG. 3 illustrates a chart of curves for pedal position to throttle output according to an embodiment of the throttle system of the machine shown in FIG. 1.
Figure 4:
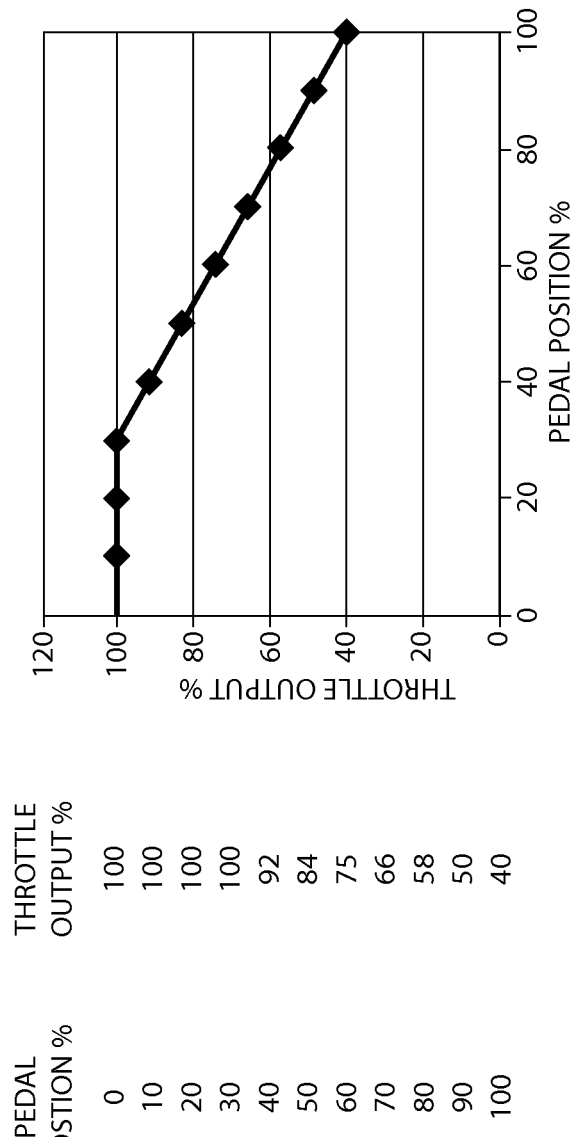
FIG. 4 illustrates a chart of a specific curve for pedal position to throttle output according to an embodiment of the throttle system of the machine shown in FIG. 1.

FIG. 3 illustrates a chart of curves for pedal position to throttle output according to an embodiment of the throttle system of the machine 10 when the hand throttle 34 is set at or above a predetermined high throttle value. What is shown is an amount (expressed in %) that the throttle is decreased based on how far (expressed in %) the food throttle 36 is depressed. FIG. 4 illustrates a chart of a specific curve for pedal position to throttle output according to an embodiment of the throttle system of the machine 10.

For example, when the controller device 38 and/or the ECU 39 determine that the hand throttle 34 is set at or above a high throttle value (e.g., 90% full throttle or above) and the controller device 38 and/or the ECU 39 determine that the foot throttle 36 is pressed approximately 40% of a full value, the controller device 38 and/or the ECU 39 will cause the power system operating speed to be reduced to approximately 92% of what the hand throttle 34 is set to, while the foot throttle 36 is pressed. These values will adjust along the curve shown in FIG. 4 or along any curve provided in the range of FIG. 3. Then, when the foot throttle is no longer pressed, the controller device 38 and/or the ECU 39 will return the power system operating speed to approximately 100% of what the hand throttle 34 is set to.

However, it should be understood that other throttle output reduction percentages may be used with different pedal position percentages. The data illustrated in FIGS. 3 and 4 may be stored as a look-up table/map on a data storage device associated with the controller device 38, the ECU 39, and/or on a stand-alone data storage device.

INDUSTRIAL APPLICABILITY

The present disclosure relates to a throttle control for a machine. In existing systems, once a hand throttle is set to a level, a foot pedal may be used to increase or "boost" the engine speed to a higher level when extra power is needed. After the foot pedal is released the engine returns to the original hand throttle setting. The hand throttle is generally a non-return device so it stays once the user has set the engine to the desired speed. In addition, a separate throttle lever may be provided to decelerate the engine speed on machines.

However, in the present disclosure, both the hand and foot pedal throttle controls work as they have traditionally, until the hand throttle is placed at or above a high throttle level (e.g., 90% or greater of a full throttle value). With the hand throttle set to a high throttle position or value, the foot pedal throttle now acts as a deceleration pedal, decreasing the engine speed from the high throttle set level, lowering the engine speed more the more you press the foot throttle. This allows the operator to run the engine at a high throttle speed during normal operation by setting the hand throttle and then temporarily reducing the engine speed using the foot throttle. If the operator sets the hand throttle to a mid-throttle position for normal operation then the engine speed can still be boosted using the foot throttle.

It will be apparent to those skilled in the art that various modifications and variations can be made to the disclosed machine throttle system. Other embodiments will be apparent to those skilled in the art from consideration of the specification and practice of the disclosed machine throttle system. It is intended that the specification and examples be considered as exemplary only, with a true scope being indicated by the following claims and their equivalents.

What is claimed is:

1. A throttle system comprising:
a power system configured to operate at different output levels;
a first throttle device;
a second throttle device; and
a control module communicatively coupled to the power system, the first throttle device, and the second throttle device, the control module configured to cause the power system to:
operate at a first output level in response to an extent of actuation of the first throttle device;
increase the output level in response to the second throttle device when the first throttle device level is set below a predetermined value, the predetermined value being adjustable; and
decrease the output level in response to the second throttle device when the first throttle device level is set at or above the predetermined value.

2. The throttle system of claim 1, wherein the first throttle device is a hand throttle device and the second throttle device is a foot throttle device.

3. The throttle system of claim 1, wherein the power system is an internal combustion engine.

4. The throttle system of claim 1, further comprising a tachometer communicatively coupled to the control module and configured to communicate a speed value of the power system to the control module.

5. The throttle system of claim 1, wherein the predetermined value is 90% or greater of a full value.

6. The throttle system of claim 1, wherein the control module is configured to communicate with the power system via an electronic control unit.

7. The throttle system of claim 1, wherein the control module is configured to reduce the output level of the power system based on the extent of actuation of the second throttle device.

8. A machine throttle system comprising:
an engine configured to operate at different output levels;
a hand throttle device;
a foot throttle device; and
a control module communicatively coupled to the engine, the hand throttle device, and the foot throttle device, the control module configured to:
receive a first input from the hand throttle device and instruct the engine to operate at a first output level in response to an extent of actuation of the hand throttle device;
receive a second input from the foot throttle device;
determine whether the first input is a high throttle value, the high throttle value being adjustable; and
instruct the engine to operate at a second output level, which is less than the first output level, in response to determining that the first input is a high throttle value.

9. The machine throttle system of claim 8, wherein the hand throttle device is configured as a level-maintaining switch.

10. The machine throttle system of claim 8, wherein the foot throttle device is configured as a momentary switch.

11. The machine throttle system of claim 8, wherein the high throttle value is 90% or greater of a full throttle value.

12. The machine throttle system of claim 8, wherein a difference between the first output level and the second output level is determined by an extent of actuation of the foot throttle.

13. The machine throttle system of claim 8, further including a tachometer communicatively coupled to the control module and configured to communicate a speed value of the engine to the control module.

14. The machine throttle system of claim 8, further including an electronic control unit communicatively coupled to the control module and configured to cause the engine to operate at the first output level or at the second output level, as instructed by the electronic control unit.

15. A machine comprising:
a frame;
an engine supported by the frame and configured to operate at different output levels;
a propulsion system coupled to the frame and the engine, the propulsion system configured to propel the machine; and
a throttle system including:
a hand throttle device;
a foot throttle device; and a control module communicatively coupled to the engine, the hand throttle device, and the foot throttle device, the control module configured to:

receive a first input from the hand throttle device based on a percent of actuation of the hand throttle device and instruct the engine to operate at a first output level in response to the first input;

determine whether the first output level is a high throttle value, the high throttle value being adjustable;

receive a second input from the foot throttle device based on a percent of actuation of the foot throttle device; and instruct the engine to operate at a second output level, which is less than the first output level, in response to determining that the first input is a high throttle value.

16. The machine of claim 15, further comprising a pair of lift arms pivotably coupled to the frame.

17. The machine of claim 16, further comprising a work tool pivotably coupled to the pair of lift arms.

18. The machine of claim 15, wherein the propulsion system includes wheels or tracks.

19. The machine of claim 15, further including a tachometer communicatively coupled to the control module and configured to communicate a speed value of the engine to the control module.

20. The machine of claim 15, wherein the machine is configured as a skid-steer loader machine.

* * * * *